US012722152B2

(12) United States Patent
Focht

(10) Patent No.: US 12,722,152 B2

(45) Date of Patent: Sep. 1, 2026

(54) FLOW CHAMBER FOR MICROSCOPY

(71) Applicant: BIOPTECHS, Inc., Butler, PA (US)

(72) Inventor: Daniel C. Focht, Fenelton, PA (US)

( * ) Notice: Subject to any disclaimer, the term of this patent is extended or adjusted under 35 U.S.C. 154(b) by 617 days.

(21) Appl. No.: 17/404,790

(22) Filed: Aug. 17, 2021

(65) Prior Publication Data

US 2023/0056421 A1 Feb. 23, 2023

(51) Int. Cl.

*G02B 21/34* (2006.01)
*B01L 3/00* (2006.01)

(52) U.S. Cl.

CPC ... *B01L 3/502715* (2013.01); *B01L 3/502761* (2013.01); *G02B 21/34* (2013.01); *B01L 2200/027* (2013.01); *B01L 2200/0689* (2013.01); *B01L 2300/0822* (2013.01); *B01L 2300/0877* (2013.01)

(58) Field of Classification Search

CPC ................ G02B 21/00; G02B 21/0016; G02B 21/0032; G02B 21/0088; G02B 21/06; G02B 21/24; G02B 21/26; G02B 21/34; B01L 3/50; B01L 3/502; B01L 3/5021; B01L 3/5027; B01L 3/502715; B01L 3/502761

USPC .................................................. 359/391–398

See application file for complete search history.

(56) References Cited

U.S. PATENT DOCUMENTS 4,974,952 A 12/1990 Focht
5,170,286 A * 12/1992 Zimmerberg .......... G02B 21/34 359/398
5,414,556 A 5/1995 Focht
5,598,888 A 2/1997 Sullivan
6,760,154 B1 7/2004 Focht
7,245,368 B2 * 7/2007 Scaduto ................. G02B 21/26 356/244
7,518,720 B2 * 4/2009 Kolp ...................... G01N 21/09 356/244
8,064,050 B2 * 11/2011 Domaschko ........... G01N 21/05 356/244

(Continued)

OTHER PUBLICATIONS

Rath H, Stumpp SN, Stiesch M (2017) Development of a flow chamber system for the reproducible in vitro analysis of biofilm formation on implant materials. PLoS One 12(2):e0172095. (Year: 2016).*

*Primary Examiner* — Thong Q Nguyen

(74) *Attorney, Agent, or Firm* — Spilman Thomas & Battle, PLLC; Shane P. Riley

(57) ABSTRACT

A flow chamber for live-cell microscopic observation. The flow chamber includes a top portion having at least two perfusion tubes and a central aperture throughout. A pressure distribution/perfusion ring is adjacent to the top portion. An upper gasket engages and seals the pressure distribution/perfusion ring and the microaqueduct slide. The microaqueduct slide is placed between the upper gasket and the lower gasket. A cover slip is arranged intermediate the lower gasket, and a base. A flow chamber is formed between the cover slip, the microaqueduct slide, and the lower gasket. The flow chamber is in fluid communication with the at least two perfusion tubes in the top portion. The microaqueduct slide has perfusion grooves and micro-channels are formed through the microaqueduct slide and through the upper and lower gaskets. The base has a raised rim portion to receive the pressure distribution/perfusion ring in a non-rotational fit.

12 Claims, 3 Drawing Sheets

(56) References Cited

U.S. PATENT DOCUMENTS

| | | | | |
|---|---|---|---|---|
| 10,252,264 | B2 * | 4/2019 | Shen | C12N 15/1006 |
| 2008/0174862 | A1 | 7/2008 | Focht | |

* cited by examiner

FLOW CHAMBER FOR MICROSCOPY

BACKGROUND

The application generally relates to a flow chamber. The application relates more specifically to a flow chamber for imaging live-cell specimens that is assembled directly on a microscope stage.

The examination and observation of microscopic specimens is of great interest to scientists and engineers doing research in the physical and biological sciences. Specimen size can range from tens of microns to sub-micron. It is also of great scientific value to study the effects of experimental treatments on such specimens and to examine any changes, modifications, transformations, and other effects that result from experimental treatments of these specimens. As the specimens or portions of specimens being analyzed are of extremely small dimensions and they are observed in very advanced microscopes, and optical microscopes using techniques such as serial plane deconvolution, confocal imaging, multi-photon imaging, total internal reflection fluorescence (TIRF) and other electronic or optical techniques, including but not limited to reflected light or transmitted light microscopes.

Previously, live cell chambers such as the Leiden, Sykes-Moore, and Dvorak-Stotler culture chambers were used on an inverted microscope. These chambers would permit the perfusion of liquids onto optical surfaces that were too far apart from each other for the desired image quality when used in the most common forms of microscopy such as brightfield, darkfield, phase, DIC, and fluorescence. Another drawback of previous chambers is that the perfusion method directed a concentrated stream of liquid that could wash away the specimen.

Subsequently, a live-cell chamber was developed with controlled laminar flow perfusion using micro-aqueducts to distribute media into an optical flow cavity. The older chambers were difficult to load and assemble, as the chamber may require precise placement of delicate components that may be easily broken. Also, temperature control was difficult to maintain. In some instances, efforts to control temperature resulted in damage to the microscope optics due to the use of peripheral only heating.

These longstanding problems have continually challenged those people engaged in live cell research. Since nothing else was available on the market that gave the researchers what they wanted, they used whatever was available until the demands of high-resolution fluorescent microscopy made it necessary for a new design to handle the requirements of live cell research.

The ideal live cell chamber construction sought by the researchers in fluorescent microscopy would enable enhanced performance from the microscope; long term life of the cells within a closed system; rapid perfusion of the cells into and through the chamber; laminar flow of a pre-equilibrated medium through the chamber; as well as, a temperature regulation and stabilization of the medium both within the chamber and throughout the closed-circuit system.

In addition, all of the structural components of the live cell chamber would have to be nonreactive to biological materials and fit on a standard microscope with an absolute minimum amount of modification to the original design of the scope. The chamber must also be capable of conducting an ample volume of media in a defined or laminar motion across the specimen without leaking or damaging the cells. The ideal design should further allow for easy care and maintenance of the live cell chamber; as well as, ease of loading of specimens.

In the case of transmitted light applications, the specimen should be able to be viewed using Koehler illumination. The particular spacing and the optical materials employed have to be compatible with standard microscopy and the viewing surface has to be large enough to allow room for movement of the chamber when used with large diameter objectives to present the cells in such a way that they can be observed at the highest degree of resolution without damage to the cells.

From a temperature standpoint the live cell chamber temperature has to be able to be regulated to accommodate the characteristics of different samples. In order to do this the temperature has to be monitored in the media flow region, and once the required temperature has been obtained it also should be stabilized within one to two tenths of a degree centigrade.

Often, it is desirable to control the temperature of a specimen undergoing microscopic examination. The goal may be to raise the temperature or to lower it. See for example U.S. Pat. No. 5,598,888, wherein cryogenics is employed to cool the specimen. When heat is required, heat energy has to be applied efficiently and uniformly to the specimen being examined to maintain its physiological conditions or induce changes or effects in the specimen. In the case of mammalian specimens, biologists often need to warm a specimen, cells, or tissue samples to ideal physiological temperatures on a microscope in order to study them.

The source of the heat for warming a specimen is usually electro-resistive, Peltier, or circulation of a pre-warmed fluid. The previously used method has been to heat the entire plate so that a specimen placed on the plate will absorb the heat. Therefore, thermal support is limited to peripheral heating. This technique induces problems that can interfere with high-resolution microscopy. These problems include: 1) that peripheral heat transfer is inefficient; 2) that an overly large surface of metal is heated; 3) that more heat is transferred to the stage of the microscope by conductive means than reaches the specimen by radiative means because there is more of the heated plate in direct physical contact with the stage than is in contact with the specimen; 4) that the heat transferred to the stage undesirably warms the scope; and 5) that the heat causes thermal expansion of the heating plate. These latter two are important contributors to a phenomenon known as "Z-axis shift" or "Z-axis drift."

In the traditional configuration, the specimen, heating plate, and stage are stacked. When a specimen is placed on the plate and the plate is heated, the plate, being made of metal, will expand relative to its support surface (i.e. the microscope stage) as heat is applied, causing the specimen to move as the plate expands. The specimen moves with the plate as the metal plate expands in a perpendicular or Z-axis direction. Therefore, the specimen is moved out of focus.

If the plate were simply heated and expanded, but could be held at that temperature, this might help reduce or eliminate such Z-axis shift in that the specimen might move in the Z-axis upon heating to a position and stay there if the heat was constant. However, the large thermal mass of the plate and changing ambient conditions inhibits the ability to maintain consistency if the plate cools and retracts during the cycles of the heating and cooling process, the specimen again moves with the contractions and expansions of the plate along a Z-axis, again moving the specimen in and out of focus.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The presently claimed invention relates generally to a flow chamber for live-cell microscopic observation having a central aperture extending through the flow chamber and a pressure distribution/perfusion ring facilitating fluidic transfer through an optical cavity formed between a coverslip and a microaqueduct slide separated by a gasket.

As will become clear in the detailed description of the preferred embodiments of the invention below, an advantage of the disclosed invention is an easily assembled flow chamber with tensioning means, which allows the user to place the components upright inside a rotationally restrictive cylinder and uniformly seal them without special tools or skill.

Another advantage is that the product is less complicated to assemble therefore improves the value and marketability of microscopy systems in clinical as well as research applications.

Still another advantage is that the flow chamber may be used with existing standard size coverslips, gasket and microaqueduct slide components to form an optical cavity.

Another advantage is a flow chamber designed specifically for the demands of live-cell imaging requirements. The flow chamber provides limitless flow characteristics because its flow geometry can easily be customized by the user. It provides the ability to configure the optical cavity to produce controlled shear forces, flow characteristics, high or low volume exchange rates, near laminar flow, and nearly anything in between. The media is constrained to flow in a precise location over the cells. When compared with open dish type chambers which are heated only peripherally do not provide the discrete flow capabilities and uniform temperature control, in a user configurable, perfusable, optical imaging cavity.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Figure 1:
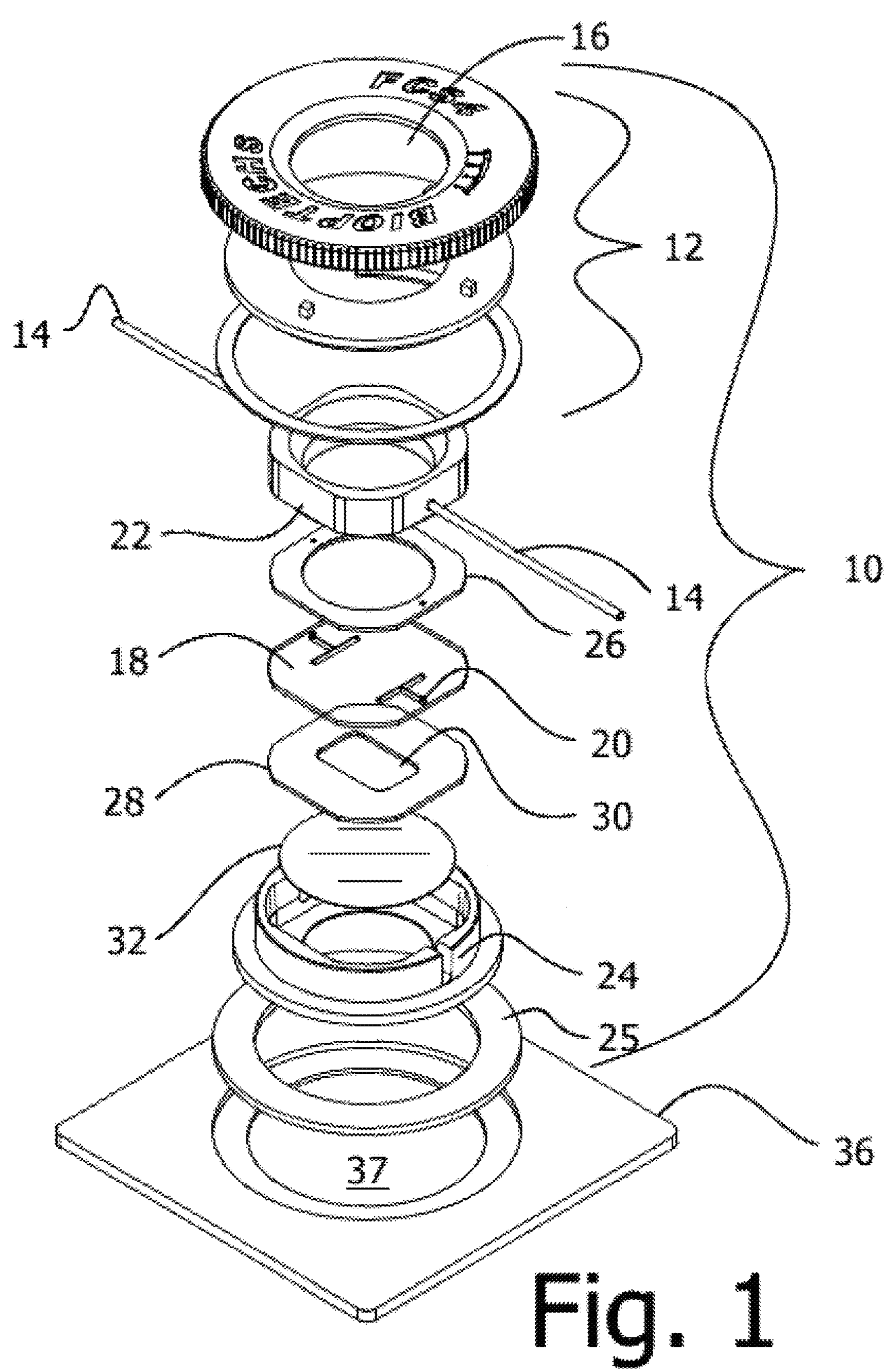
FIG. 1 is an exploded perspective view of the flow chamber for live-cell microscopic observation.

One embodiment of the presently disclosed invention relates to a flow chamber for live-cell microscopic observation. The flow chamber includes a threaded securing means having a central aperture. The central aperture extends through the flow chamber to provide illumination and facilitate observation. A pressure distribution/perfusion ring is located adjacent to the top portion. The pressure distribution/perfusion ring has a predetermined geometry to facilitate a fluidic transfer through an optical cavity formed between a coverslip and a micro aqueduct slide separated by a gasket having a specific central aperture. The pressure distribution/perfusion ring uniformly applies pressure to an upper gasket, a microaqueduct slide, a lower gasket and a coverslip that are arranged so that the components are uniformly compressed into a base. The upper gasket operatively engages and seals the pressure distribution/perfusion ring to the microaqueduct slide. The microaqueduct slide is placed between the upper gasket and the lower gasket. A cover slip is positioned adjacent the lower gasket opposite the microaqueduct slide, and is operatively disposed intermediate, the lower gasket and a base. A flow chamber is formed between the cover slip, the microaqueduct slide, and the lower gasket. The perfusion chamber is in fluid communication with at least two perfusion tubes in the pressure distribution/perfusion ring. The microaqueduct slide has perfusion grooves formed into the microaqueduct slide. These grooves or micro-channels, in combination with the lower gasket, form a fluidic path. The base has a raised rim portion defining a peripheral geometric recess complementary to the geometric shape of the pressure distribution/perfusion ring. The recess is arranged to receive the distribution/perfusion ring in a non-rotational friction fit.

An upper gasket, a microaqueduct slide, and a lower gasket are arranged so that the upper gasket operatively engages and seals the pressure distribution/perfusion ring and the microaqueduct slide. The microaqueduct slide is placed between the upper gasket and the lower gasket. A cover slip is positioned adjacent the lower gasket opposite the microaqueduct slide, and is operatively disposed intermediate, the lower gasket and a base. A flow chamber is formed between the cover slip, the microaqueduct slide, and the lower gasket. The perfusion chamber is in fluid communication with at least two perfusion tubes in the top portion. The microaqueduct slide has perfusion grooves formed in the microaqueduct slide, and micro-channels formed through the microaqueduct slide are bordered by the lower gasket unit. The base has a raised rim portion defining a peripheral geometric recess complementary to the geometric shape of the pressure distribution/perfusion ring. The recess is arranged to receive the pressure distribution/perfusion ring in a non-rotational friction fit.

In another embodiment, a perfusion ring assembly for a flow chamber is disclosed. The perfusion ring assembly includes a pressure distribution/perfusion ring, a coverslip, an upper gasket, a lower gasket and a microaqueduct slide disposed between the upper gasket and the lower gasket. The upper gasket operatively engages and seals the pressure distribution/perfusion ring. The coverslip and the micro aqueduct slide are separated by the upper gasket and include a specific central aperture defining an optical cavity therebetween. The pressure distribution/perfusion ring is adjacent to the top portion and has a predetermined geometry to facilitate a fluidic transfer through the optical cavity. A cover slip positioned adjacent the lower gasket opposite the microaqueduct slide and operatively disposed intermediate the microaqueduct slide and a receiver platform. A flow chamber is formed between the cover slip, the microaqueduct slide, and the lower gasket. The perfusion chamber is in fluid communication with at least two perfusion tubes in the top portion.

In a third embodiment, a perfusion ring assembly for a flow chamber having a specimen warmer is disclosed. The perfusion ring assembly includes a pressure distribution/perfusion ring, an upper gasket, microaqueduct slide a lower gasket and a coverslip. The upper gasket operatively engages and seals the pressure distribution/perfusion ring. The coverslip and the micro aqueduct slide are separated by the lower gasket and include a specific central aperture defining an optical cavity therebetween. The pressure distribution/perfusion ring is adjacent to the top portion and has a predetermined geometry to facilitate a fluidic transfer through the optical cavity. A cover slip positioned adjacent the lower gasket opposite the microaqueduct slide and operatively disposed intermediate the lower gasket and a receiver platform. A flow chamber is formed between the cover slip, lower gasket and the microaqueduct slide. The perfusion chamber is in fluid communication with at least two perfusion tubes in the top portion. A microscope specimen warmer with a plate structure having minimal thermal conductivity and a minimal expansion coefficient. The specimen warmer includes a support surface on the base plate structure. A specimen resting surface is defined within the base plate structure so that the support surface on the base plate structure is at or near the same horizontal plane as a specimen within the specimen resting surface so that there is no detectable z-axis shift of the specimen when the specimen is heated.

Alternative exemplary embodiments relate to other features and combinations of features as may be generally recited in the claims.

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Referring to FIG. 1, a flow chamber, generally designated as 10, is shown in an exploded perspective view. Flow chamber 10 includes a top portion 12 having a central aperture for illumination and observation of specimens plated on or contained within the optical cavity defined between the micro aqueduct slide 18 and the coverslip 32. Two or more perfusion tubes 14 extend from the sides of a pressure distribution/perfusion ring 22. The perfusion tubes 14 in fluid communication with laminar flow ports, or perfusion grooves, or micro-channels, 20 on microaqueduct slide 18. Pressure distribution/perfusion ring 22 is located under top portion 12 having a rotational torque indicator. The pressure distribution/perfusion ring 22 defines a circular aperture and having squared peripheral sides for alignment with a receiver platform, or base 24. Pressure distribution/perfusion ring 22 applies uniform pressure to components 26, 18, 28, and 32 against platform 24.

An upper gasket 26 is disposed between pressure distribution/perfusion ring 22 and microaqueduct slide 18 to provide a liquid-tight sealed periphery with pressure distribution/perfusion ring 22. Upper gasket 26 comprises a generally circular aperture with squared sided geometry and made of, thin resilient member preferably fabricated from an inert material such as rubber, or silastic sheeting. Upper gasket 26 is dimensioned to be received in a lower side of pressure distribution/perfusion ring 22. In addition, upper gasket 26 has a central aperture with approximately the same radius as aperture 16. Microaqueduct slide 18 rests on lower gasket 28. Lower gasket 28 includes a viewing aperture. The aperture 30 may take any geometric shape, e.g., rectangular, square, round, oval, or other desired shape. Preferably lower gasket 28 may have a thickness ranging from 0.01 millimeter (mm) to 2.0 mm to allow the volume and flow characteristics to be customized for the flow chamber 10. Similarly, lower gasket 28 is a thin, resilient member preferably fabricated from an inert material such as rubber, or silastic sheeting.

Stage adapter 36 comprises a generally rectangular rigid support plate member, typically machined from aluminum in a geometry to be compatible with the microscope stage. Central aperture 37 may be defined by inwardly beveled side walls that are dimensioned to engage beveled edges of platform 24. Stage adapter 36 may be further provided with securing means adapted to operatively engage platform 24.

Flow chamber 10 provides a closed system, live-cell micro-observation chamber 10. Flow chamber 10 provides uniform temperature control and user definable perfusion capability that is fully compatible with all modes of microscopy. It is also the only chamber to combine high-volume laminar flow perfusion rates with Koehler illumination compatibility as well as the capability of precise temperature control without the need for external peripheral temperature control. This is accomplished by both internal heating of the platform 24 and electronic control of the Microaqueduct slide 18. High-volume laminar flow perfusion rates are the result of the development of micro-aqueduct perfusion. Perfusion introduces media into a fluid optical cavity through the grooves in the Microaqueduct slide. Therefore, the separation of optical surfaces and flow geometry is determined by the thickness and internal geometry of a single gasket without the need of an additional component to facilitate flow. Therefore, the chamber is adaptable to the protocol instead of having to adapt the protocol to the chamber. Pressure distribution/perfusion ring 22 fits within platform 24 and secured by a threaded cap having an indicator of rotational torque to prevent application of excessive force on the microaqueduct slide 18 and coverslip 32 that may cause breakage or other damage to the rigid components of flow chamber 10.

Microaqueduct slide 18 comprises an enlarged transparent member fabricated from an inert material such as glass or the like with peripheral geometry that is generally round with squared or flattened sides. A plurality of opposed shallow fluid perfusion grooves 20 are formed on the bottom surface of the slide member such as by etching, or the like. The fluid perfusion grooves 20 comprise generally T-shaped mirror image micro-channels which are spaced from one another and disposed such that the stems of the T-shaped micro-channels are axially aligned with one another, while the tops of the T-shaped micro-channels are disposed generally in a parallel relationship to one another. U.S. Pat. No. 4,974,952 includes a detailed description of an exemplary microaqueduct slide, and is hereby incorporated by reference. Grooved patterns may be customized to produce specific flow characteristics.

Figure 2:
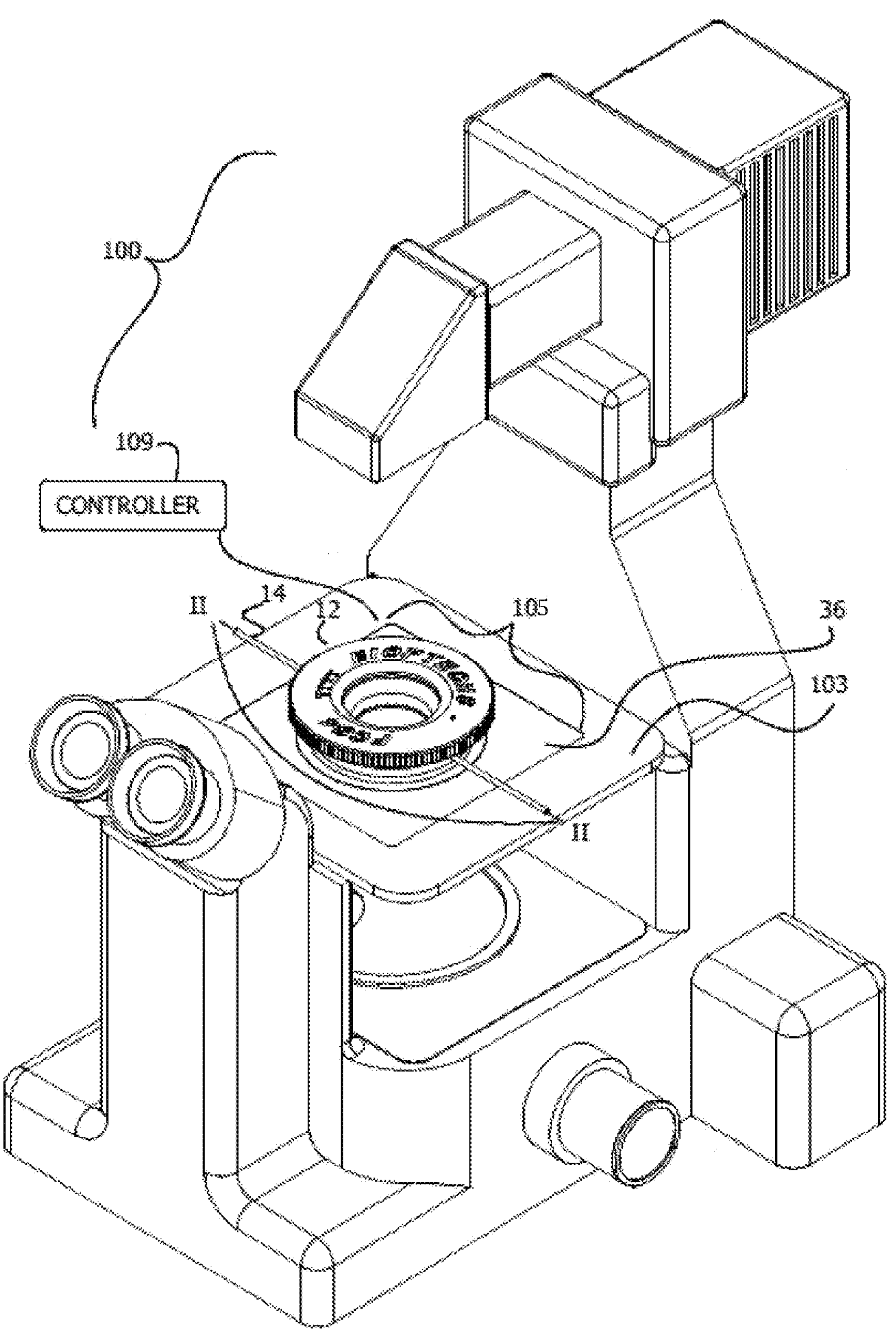
FIG. 2 is a perspective view of the novel specimen heating and retaining assembly of the present invention shown in use on the stage of a standard inverted microscope. A specimen dish and a heating element that does not form a part of the present invention are illustrated in phantom.

Referring next to FIG. 2, shown in phantom is a microscope 100 having a stage 103. On stage 103 is shown one embodiment of the novel specimen heating and retaining assembly 105 of the present invention discussed in more detail below. Located within the assembly 105 but not forming a part of the present invention, there is illustrated for informational purposes a specimen plane in which a specimen of interest for microscopic examination would be present. Also illustrated in FIG. 2 is a heating controller 109 which also does not form part of the present invention. While heating elements can vary widely and are not limiting to the present invention, for purposes of this discussion heating controller 109 is connected via electrically conductive wires 111 to a heating electroresistive heater to heat the specimen as discussed in more detail below.

Figure 3:
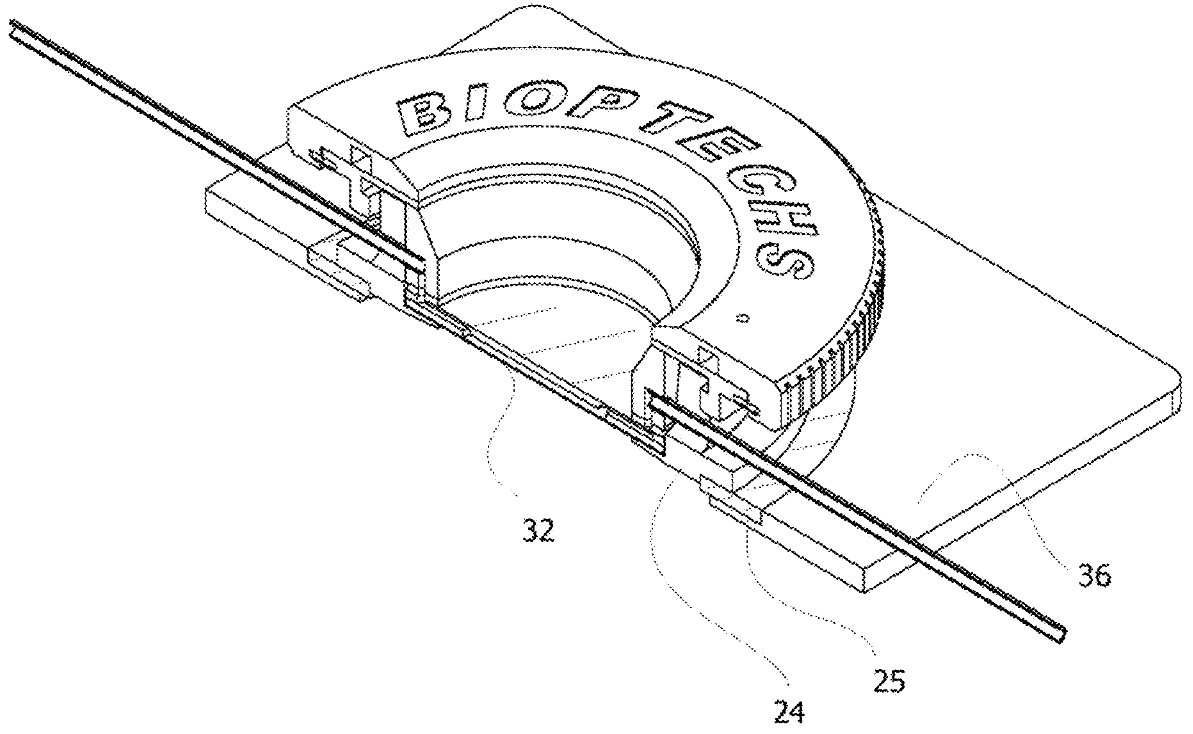
FIG. 3 is a perspective cross-sectional view of the novel specimen heating and retaining assembly of the present invention along the line II-II of FIG. 2.

Referring now to FIG. 3, there is illustrated in perspective cross section along the line II-II of FIG. 2, the novel heating and retaining assembly 105 of the present invention.

Here it is made clear the internal design of chamber 10. The point of contact with the mounting surface of stage adapter 36 is a peripheral specialty glass structure 25 on which platform 24 rest within the same plane as the specimen placed on coverslip 32. In this manner of specimen support, physical displacement in the "Z" axis plane due to thermal changes is minimized. It is also apparent that all components of the chamber numbers 12, 22, 26, 18, 28, 32, and 24 are "sandwiched" together to form a fluid optical cavity all resting on 25 within a stage adapter 36.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the flow chamber as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. A flow chamber for studying live-cell microscopic observation comprising:

at least two perfusion tubes and a central aperture through said flow chamber, the central aperture extending through a fluid optical cavity to allow illumination and facilitate observation;

a pressure distribution/perfusion ring having a geometric shape defining a predetermined geometry, a coverslip, an upper gasket, a lower gasket, a receiver platform, and a microaqueduct slide;

the upper gasket operatively engaging and sealing the pressure distribution/perfusion ring; the coverslip and the microaqueduct slide separated by the upper gasket defining the fluid optical cavity therebetween;

the pressure distribution/perfusion ring disposed adjacent to a top portion; and having the predetermined geometry to facilitate a fluidic transfer through the optical cavity;

the coverslip positioned adjacent the lower gasket opposite the microaqueduct slide;

the fluid optical cavity in fluid communication with the at least two perfusion tubes in the top portion;

wherein the receiver platform has a raised rim portion defining a peripheral geometric recess complementary to the geometric shape of the pressure distribution/perfusion ring; the pressure/distribution ring having a non-circular peripheral geometry with flattened sides configured to engage complementary surfaces of the recess to prevent rotation of the pressure distribution/perfusion ring within the recess; the recess arranged to receive the pressure distribution/perfusion ring in a non-rotational engineered friction fit.

2. The flow chamber of claim 1, wherein the pressure distribution/perfusion ring is configured to apply a uniform pressure to the upper gasket, the microaqueduct slide, the lower gasket and the coverslip.

3. The flow chamber of claim 2, wherein the pressure distribution/perfusion ring, the upper gasket, the microaqueduct slide, the lower gasket and the coverslip are arranged compressed uniformly into the receiver platform.

4. The flow chamber of claim 1, wherein the upper gasket operatively engages and seals the pressure distribution/perfusion ring to the microaqueduct slide.

5. The flow chamber of claim 1, wherein the microaqueduct slide is disposed between the upper gasket and the lower gasket.

6. The flow chamber of claim 1, wherein the coverslip is operatively disposed intermediate the microaqueduct slide and the lower gasket above the coverslip and the receiver platform below the coverslip.

7. The flow chamber of claim 1, wherein the lower gasket includes a viewing aperture and the flow chamber is formed between the coverslip, and microaqueduct slide, by the lower gasket and the viewing aperture.

8. The flow chamber of claim 1, wherein the fluid optical cavity is in fluid communication with the at least two perfusion tubes incorporated within the pressure distribution/perfusion ring.

9. The flow chamber of claim 1, wherein the microaqueduct slide comprises a plurality of perfusion grooves, and micro-channels formed through the microaqueduct slide and bordered by the lower gasket.

10. The flow chamber of claim 1 wherein the receiver platform is attachable to a microscope and supported by a stage adapter.

11. The flow chamber of claim 1, wherein the upper gasket, the lower gasket, and the microaqueduct slide have a geometric shape complementary to the geometric shape of the pressure distribution/perfusion ring.

12. The flow chamber of claim 11, wherein the receiver platform comprises a raised rim portion defining a peripheral geometric recess complementary to the geometric shape of the pressure distribution/perfusion ring, the upper and lower gaskets, and the microaqueduct slide.

* * * * *